No. 632,581. Patented Sept. 5, 1899.
F. E. MATHEWSON.
CHAINLESS BICYCLE.
(Application filed Jan. 12, 1899.)
(No Model.) 2 Sheets—Sheet 2.
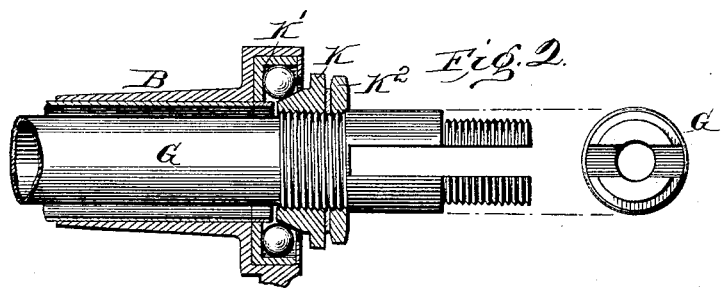
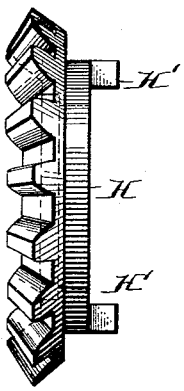
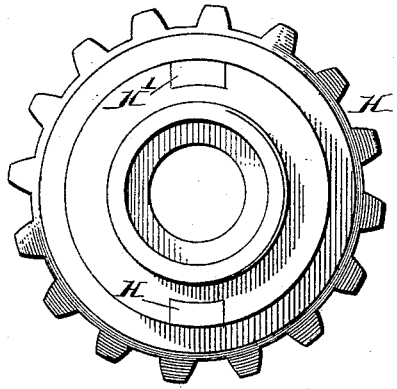
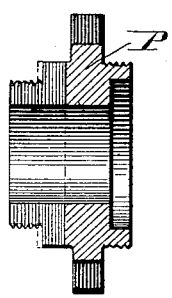
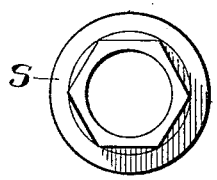
Witnesses:
J. M. Fowler Jr.
Walter B. Payne.
Inventor:
Frank E. Mathewson,
by Miles & Greene,
Attorneys.

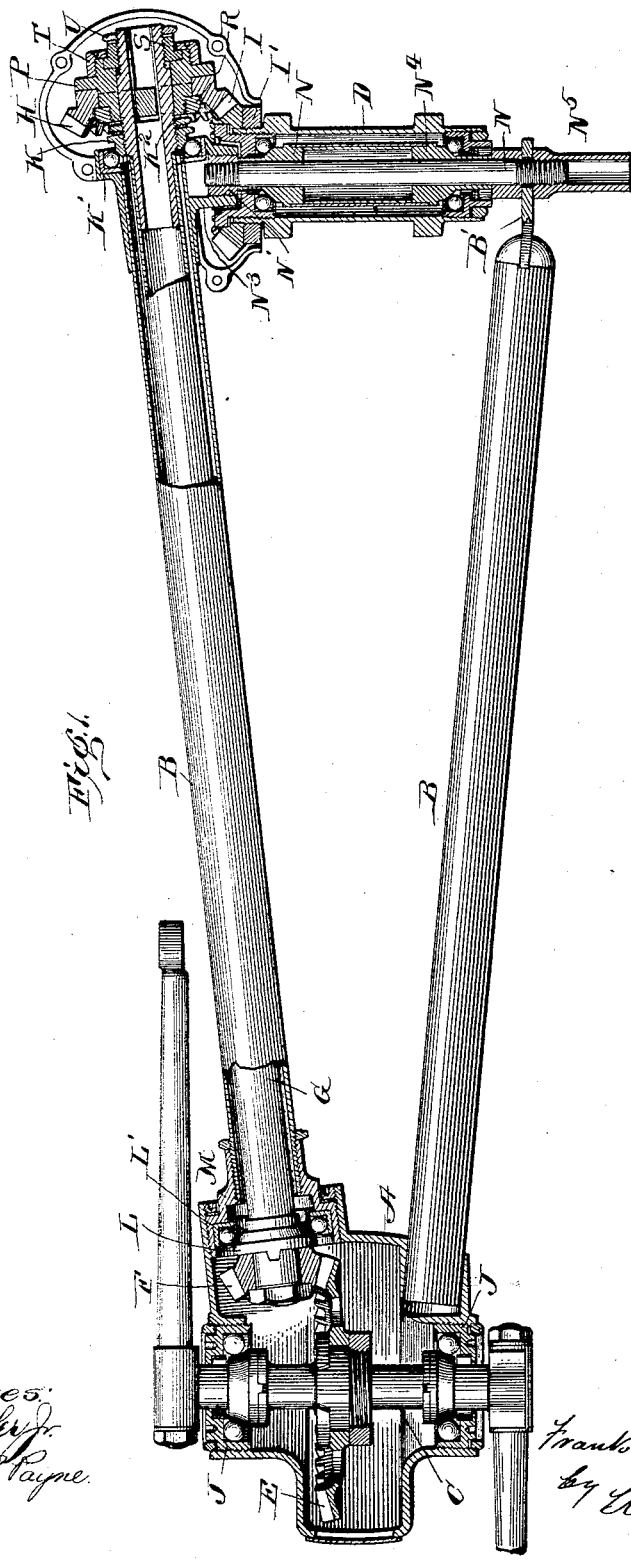

UNITED STATES PATENT OFFICE.

FRANK E. MATHEWSON, OF CHICOPEE FALLS, MASSACHUSETTS, ASSIGNOR TO THE LAMB MANUFACTURING COMPANY, OF SAME PLACE.

CHAINLESS BICYCLE.

SPECIFICATION forming part of Letters Patent No. 632,581, dated September 5, 1899.

Application filed January 12, 1899. Serial No. 701,931. (No model.)

*To all whom it may concern:*

Be it known that I, FRANK E. MATHEWSON, a citizen of the United States, residing at Chicopee Falls, in the county of Hampden and State of Massachusetts, have invented certain new and useful Improvements in Chainless Bicycles; and I do hereby declare the following to be a full, clear, and exact description of the invention, such as will enable others skilled in the art to which it appertains to make and use the same.

Bevel-gear chainless bicycles cannot be made practically so accurately as to obviate specially adjusting the gears of each individual machine. The bevel-gears must roll smoothly and without lost motion or the machine is a failure. They work thus perfectly only when each gear is at its proper distance from the common vertex of the two cones, of which the gears form a part. Differently stated, the axes and the pitch-lines of the engaging gears must meet in a common point, else there will be binding, grinding from imperfect fitting of the teeth of one in the interdental spaces of the other or there will be undue looseness and lost motion. To secure the suggested nicety of adjustment, each gear must be adjustable along the axis of its rotation.

This invention provides a convenient means for securing such perfection in adjustment and working and for binding all the parts accurately in proper relative position.

In the drawings, Figure 1 shows the entire driving mechanism connecting the crank-shaft and the rear wheel, the view being partly in plan and partly in section. Figs. 2, 3, 4, 5, 6, 7, and 8 are detail views of parts seen in Fig. 1.

In the figures, A is the hanger. B B' are the lower members of the rear fork of the frame. C is the crank-shaft, D the hub of the rear wheel, and E F are the crank-gears, acting through a shaft G within the member B to drive the rear-wheel gears H I, of which the last named is rigidly fixed to the hub D.

The gear E is moved bodily toward or away from the gear F by screwing one of the bearing-cones J inward and the other outward in the hanger. The other gear F of the pair is rigidly fixed to the shaft G, which bears near its rear end a threaded cone K, working against balls held in a cup K', carried by the frame. The cone is locked in position by a nut $K^2$. Near its front end the shaft bears a cone L, working against balls carried by a cup L', borne by a sleeve M in threaded engagement with both the hanger and frame member B. If the sleeve and the cone K be both screwed rearward or both screwed forward, the shaft G and gear F are moved positively rearward or forward, as the case may be, and this movement, in connection with the described movement of the gear E, adjusts these gears to roll on each other with ease and smoothness and with neither lost motion nor undue wear.

The two frame members B B' are connected at the rear by an axle N, which slides freely through the latter and bears at its inner end an externally and internally threaded adjusting-sleeve N', which screws into a large nipple $N^3$, projecting from the adjacent portion of the frame. It also bears two sleeve-connected cones $N^4$, one of which rests against the sleeve N', while the other lies in contact with the frame member B' in such manner that the sleeve N', the cones, and the frame member are all rigidly clamped by screwing up the step-nut $N^5$. Obviously relative rotation of the sleeve N' carries the cones bodily inward or outward upon the axle, and as the axle bears the hub D, to which the gear I is rigidly fixed by a nut I', the gear is thus moved toward or away from the line of the shaft G.

The gear H is mounted upon a bushing P, slotted to receive lugs H' upon the gear, so that both must turn together. The bushing projects upon each side beyond the gear and is diametrically slotted to receive a key Q, and both the key and the gear are rigidly held in place by a nut R. The rear end of the shaft G is slotted, and over it is slipped the bushing P, the bar or key Q fitting in the slot. A shouldered gear-adjusting sleeve S is then screwed upon the threaded end of the shaft and against the bushing P. A cap-nut T holds the sleeve and bushing in revoluble engagement, and a lock-nut U fixes the sleeve in any desired position. Ordinary non-revoluble washers are of course used wherever necessary between lock-nuts and parts locked thereby.

The independent adjustment of both gears H I gives here the same accuracy as in the crank-shaft gears and the adjustment in no way disturbs the latter gears. Both pairs being in proper adjustment, the whole combination is in perfect working condition.

Since changes can be made without passing the proper limits of my invention, I do not wish to limit myself to the exact forms set forth.

What I claim is—

1. The combination with a crank-hanger, of a crank-shaft mounted in the hanger, a driving-gear fixed upon said crank-shaft, means for adjusting the crank-shaft longitudinally a sleeve in threaded engagement with the hanger, a ball-bearing in said sleeve, means for locking the sleeve to the hanger, a shaft mounted in said ball-bearing, a gear fixed to the shaft and engaging the driving-gear, a rear fork member in threaded engagement with said sleeve, and means for locking said sleeve and member against relative rotation.

2. The combination with the rear fork members, of the externally and internally threaded sleeve adjustably fixed in one member, the axle screwed into said sleeve, the sleeve-connected cones sliding upon the axle and abutting against said sleeve, a nut upon the opposite end of the axle pressing the sleeve-connected cones against said sleeve and locking both, a hub carried by the sleeve-connected cones, and a driven gear fixed to the inner end of the hub; whereby slight rotation of the sleeve adjusts the gear, while mere removal of the axle frees the hub from the frame without disturbing any adjustments whatever.

3. The combination with the driving-shaft, of the hub, the gear rigidly secured to the hub, a bushing sliding without rotation upon the shaft, and a second gear rigidly mounted upon the bushing and engaging the gear first mentioned.

4. The combination with the driving-shaft slotted at its rear end, of a bushing sliding upon the slotted end, a gear fixed upon the bushing, a key engaging the bushing and sliding in the slot, and a nut locking the gear and key, substantially as set forth.

5. The combination with the slotted driving-shaft, of a gear-bushing sliding upon the slotted portion of the shaft, a gear removably fixed upon the bushing, a key rigidly secured to the bushing and lying in the slot in the shaft, and positive means for sliding the bushing.

6. The combination with the driving-shaft, of a gear-bushing arranged to slide freely without rotation upon the shaft, a gear rigidly mounted upon the bushing, and an adjusting-sleeve in free revoluble engagement with the bushing and in threaded engagement with the shaft.

7. The combination with the slotted driving-shaft, of the bushing sliding upon the shaft, the gear detachably fixed to the bushing, the key lying in the shaft's slot and engaging the bushing, the nut clamping the bushing, gear and key into one whole, the adjusting-sleeve moving that whole upon the shaft, and the nut locking the sleeve.

In testimony whereof I affix my signature in presence of two witnesses.

FRANK E. MATHEWSON.

Witnesses:
 C. J. WETSEL,
 HOWARD L. HOLT.